United States Patent
Root

(10) Patent No.: US 10,423,869 B1
(45) Date of Patent: Sep. 24, 2019

(54) INTERCHANGEABLE TAG COMMUNICATIONS SYSTEMS FOR CONSUMER APPLIANCES

(71) Applicant: Haier US Appliance Solutions, Inc., Wilmington, DE (US)

(72) Inventor: Steven Keith Root, Buckner, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/021,096

(22) Filed: Jun. 28, 2018

(51) Int. Cl.
| | |
|---|---|
| *G06K 19/07* | (2006.01) |
| *H04B 5/00* | (2006.01) |
| *H04W 56/00* | (2009.01) |
| *G06K 17/00* | (2006.01) |

(52) U.S. Cl.
CPC ....... *G06K 19/0723* (2013.01); *H04B 5/0062* (2013.01); *H04W 56/0015* (2013.01); *G06K 2017/007* (2013.01)

(58) Field of Classification Search
CPC ............ G06K 19/0723; H04B 5/0062; H04W 56/0015
USPC ........................................................ 340/10.1
See application file for complete search history.

(56) References Cited

U.S. PATENT DOCUMENTS

| | | | |
|---|---|---|---|
| 7,647,663 B2 | 1/2010 | Kim et al. | |
| 8,498,572 B1* | 7/2013 | Schooley | H04B 5/0031 455/41.1 |
| 9,558,653 B2 | 1/2017 | Ha et al. | |
| 9,631,311 B2 | 4/2017 | Ha et al. | |
| 9,722,668 B2 | 8/2017 | Ha et al. | |
| 9,739,004 B2 | 8/2017 | Ha et al. | |
| 2016/0215430 A1* | 7/2016 | Ha | G08C 17/02 |

FOREIGN PATENT DOCUMENTS

| | | |
|---|---|---|
| EP | 3116247 A1 | 1/2017 |
| KR | 20170115624 A | 10/2017 |
| WO | WO2017143821 A1 | 8/2017 |

\* cited by examiner

*Primary Examiner* — Curtis B Odom
(74) *Attorney, Agent, or Firm* — Dority & Manning, P.A.

(57) ABSTRACT

An appliance communication system is provided herein. The appliance communications system may include an appliance and a passive command tag. The appliance may include a controller configured to direct an operating cycle and an interface module configured to receive an instruction signal corresponding to the operating cycle. The passive command tag may be separably engaged with the appliance in selective communication with the interface module. The passive command tag may be configured to transmit the instruction signal in response to a read signal received from the interface module. The controller may be configured to vary the operating cycle based on the received instruction signal.

20 Claims, 3 Drawing Sheets

INTERCHANGEABLE TAG COMMUNICATIONS SYSTEMS FOR CONSUMER APPLIANCES

FIELD OF THE INVENTION

The present subject matter relates generally to systems and methods for communicating or interfacing with consumer appliances to affect the operation or performance of those consumer appliances.

BACKGROUND OF THE INVENTION

Conventional consumer appliances generally provide one or more user interfaces that a consumer or user can utilize to direct the operations and performance of the consumer appliances. For instance, a particular consumer appliance may include multiple knobs, buttons, switches, touchscreens, or other input mechanisms through which a user can select or change various operational settings of that particular consumer appliance. As consumer appliances have become more advanced, such as through the integration and use of processing devices and advanced algorithms, user interfaces for these appliances have become increasingly complicated. Whereas past consumer appliances could be used intuitively, with little supplemental instruction or knowledge, modern consumer appliances often require indepth knowledge or instruction to utilize all of the appliances' features.

As an example of the increasing complications in the user interfaces for consumer appliances, modern laundry appliances (e.g., washing machine appliances, dryer appliances, etc.) often include settings or options to vary an operational cycle (e.g., cleaning operation or laundry operation) based on the exact size, color, and fabric of articles being treated within the appliances. Further settings or options that vary the operational cycle based on relative energy use or additives (e.g., detergent, bleach, fabric softener, etc.) may also be available. Although such settings may be useful in preserving and treating clothes articles, many users may find it difficult to select the proper settings or even know which settings to select from an array of buttons, knobs, or animated graphical user interface (GUI). The problem may be especially pronounced if a user is forced to enter similar or redundant information in both a washing machine appliance and dryer appliance. In some instances, characteristics or occurrences during the operation of one appliance (e.g., washing machine appliance) may influence desirable settings or characteristics of another appliance (e.g., dryer appliance).

As a result, improved user interfaces for consumer appliances would be useful. In particular, it would be advantageous to provide an appliance or communications system addressing one or more of the above identified issues.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an appliance communication system is provided. The appliance communications system may include an appliance and a passive command tag. The appliance may include a controller configured to direct an operating cycle and an interface module configured to receive an instruction signal corresponding to the operating cycle. The passive command tag may be separably engaged with the appliance in selective communication with the interface module. The passive command tag may be configured to transmit the instruction signal in response to a read signal received from the interface module. The controller may be further configured to vary the operating cycle based on the received instruction signal.

In another exemplary aspect of the present disclosure, an appliance communication system is provided. The appliance communications system may include an appliance and a plurality of passive command tags. The appliance may include a controller configured to direct an operating cycle and an interface module configured to receive an instruction signal corresponding to the operating cycle. The plurality of passive command tags may each be configured to selectively and individually communicate with the interface module. Each passive command tag of the plurality of passive command tags may be configured to transmit a unique instruction signal in response to a read signal received from the interface module. The controller may be further configured to vary the operating cycle based on a received instruction signal from one passive command tag of the plurality of passive command tags.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
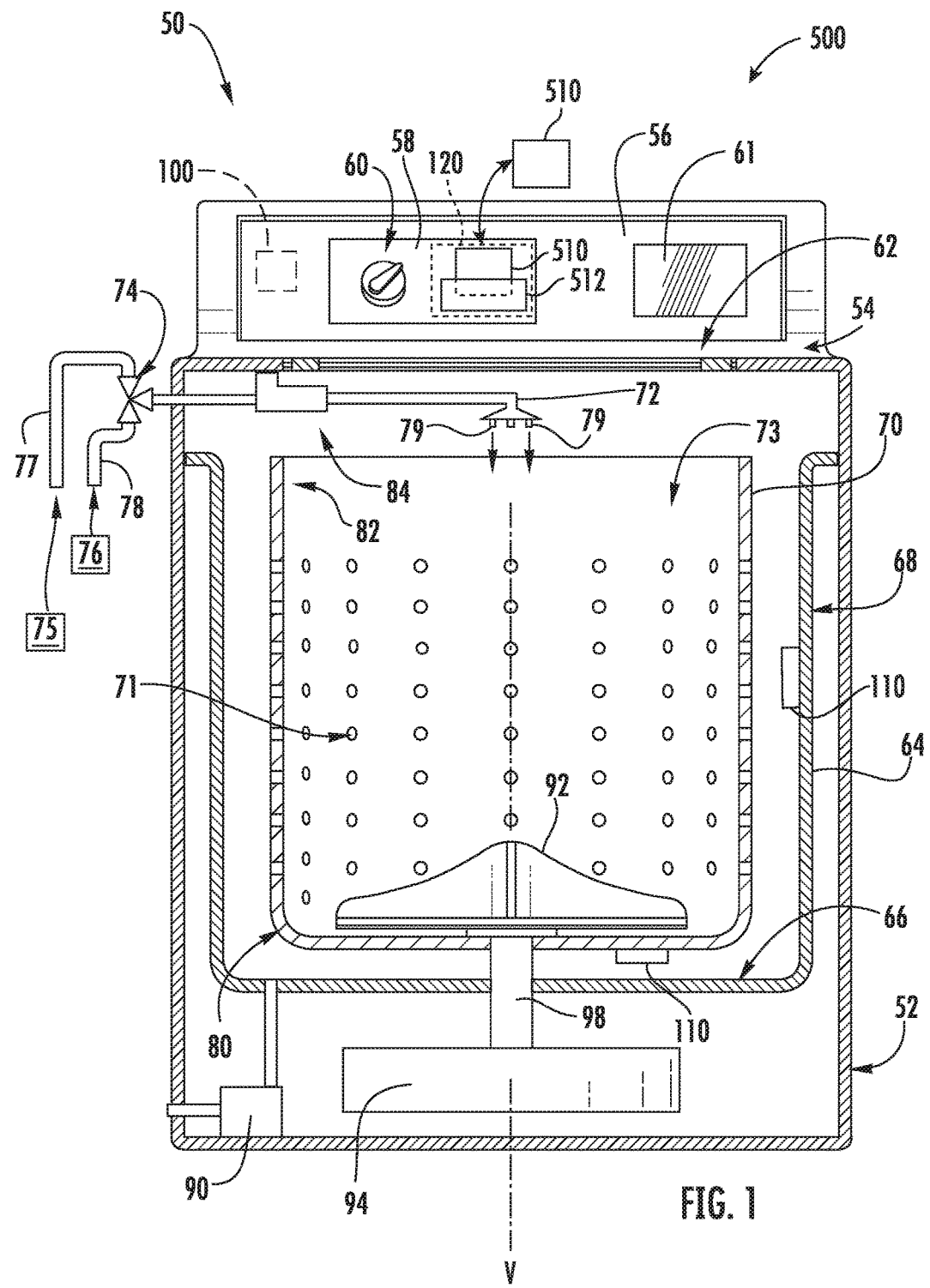
FIG. 1 is a front, cross-sectional, perspective view of a communications assembly and washing machine appliance in accordance with an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

It is noted that, for the purposes of the present disclosure, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
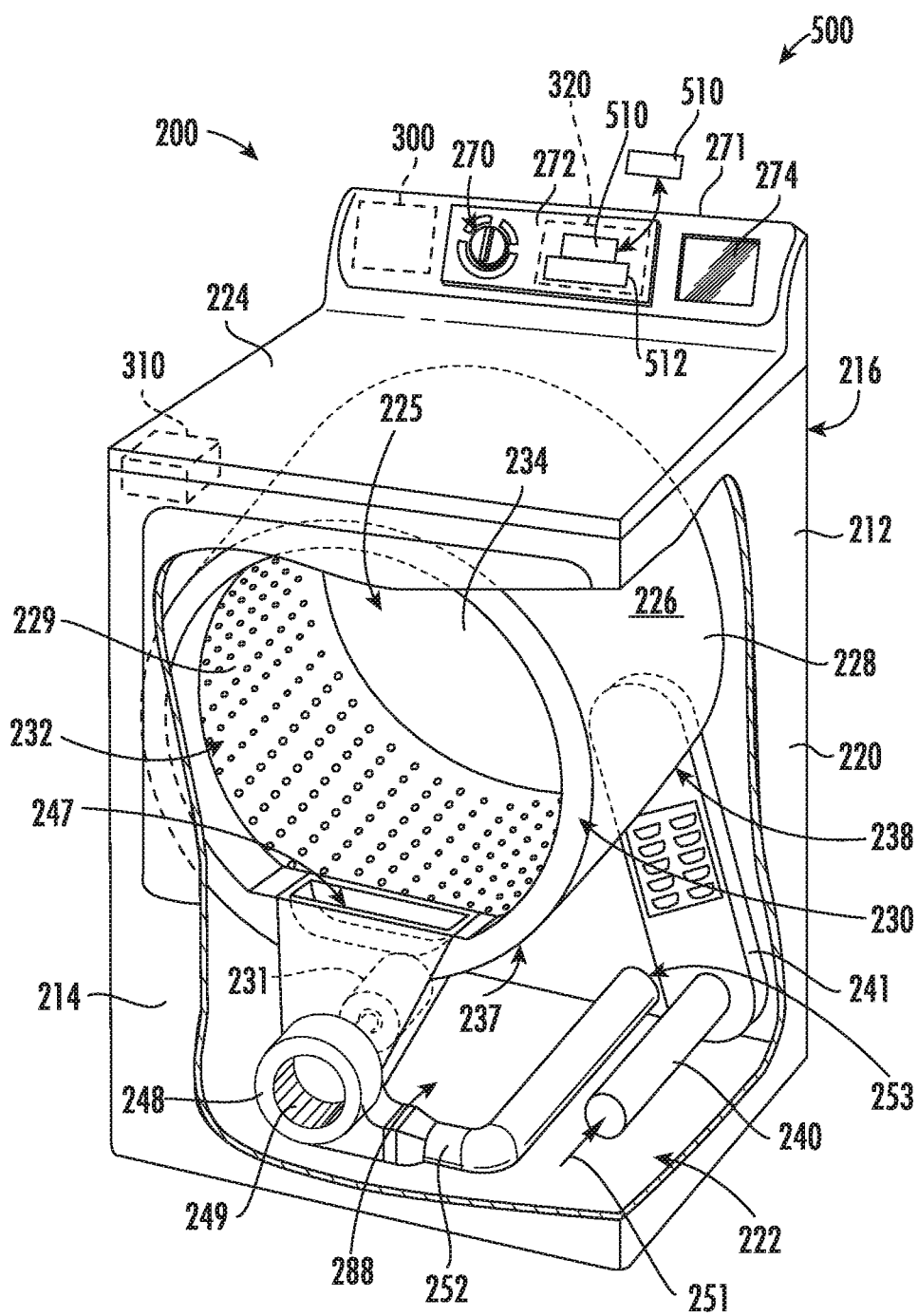
FIG. 2 is a front, cross-sectional, perspective view of a communications assembly and dryer appliance in accordance with an exemplary embodiment of the present disclosure.
Figure 3:
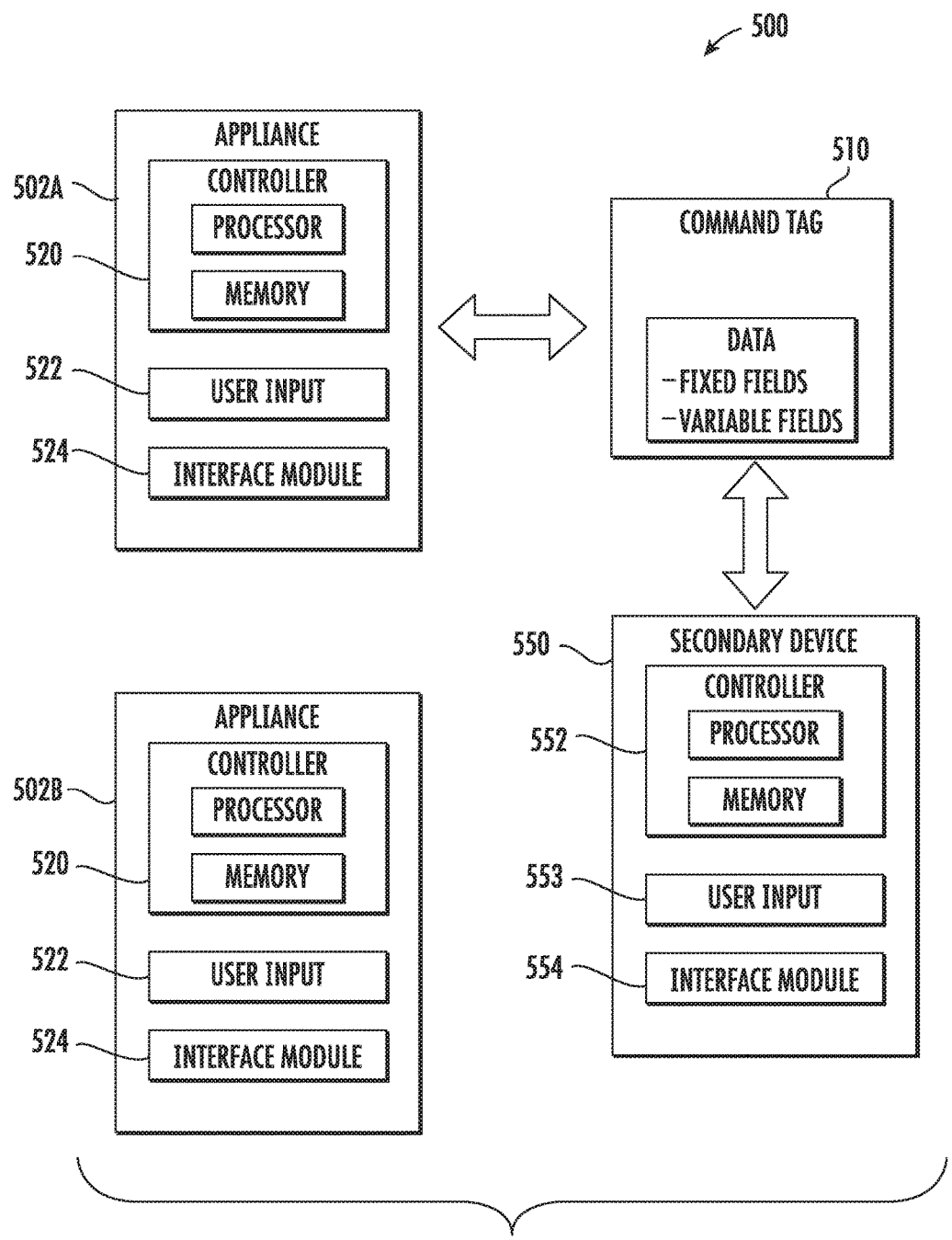
FIG. 3 is a schematic view of a communications assembly in accordance with an exemplary embodiment of the present disclosure.

Turning now to the figures, FIG. 1 is a front, cross-sectional, perspective view of a communications assembly 500 and washing machine appliance 50 in accordance with an exemplary embodiment of the present disclosure. FIG. 2 is a front, cross-sectional, perspective view of a communications assembly 500 and dryer appliance 200 in accordance with an additional or alternative exemplary embodiment of the present disclosure. FIG. 3 is a schematic view of a communications assembly 500, including multiple appliances 502A, 502B in accordance with a further additional or alternative exemplary embodiment of the present disclosure.

Although FIGS. 1 and 2 illustrate exemplary washing machine appliances and dryer appliances, is understood that the present subject matter may be used in, or for, any other suitable consumer appliance. Such other appliances include oven appliances, dishwasher appliances, refrigerator appliances, air conditioning appliances (e.g., thermostats of an air-conditioning assembly), etc.

As may be seen in FIG. 1, washing machine appliance 50 includes a cabinet 52 and a cover 54. In optional embodiments, a backsplash 56 extends from cover 54, and a control panel 58 including an input selector 60 (e.g., a single button, knob, or switch) is coupled to backsplash 56. Control panel 58 and input selector 60 collectively form at least a portion of a user interface for operator (i.e., user) selection of machine cycles and features. In additional or alternative embodiments, a display 61 indicates selected features, a countdown timer, or other items of interest to machine users. A lid 62 is mounted to cover 54 and is rotatable between an open position facilitating access to a wash tub 64 located within cabinet 52 and a closed position forming an enclosure over tub 64.

Tub 64 includes a bottom wall 66 and a sidewall 68. A wash drum or wash basket 70 is rotatably mounted within tub 64. In particular, basket 70 is rotatable about a vertical axis V. Thus, washing machine appliance 50 is generally referred to as a vertical axis washing machine appliance. Basket 70 defines a wash chamber 73 for receipt of articles for washing and extends (e.g., vertically) between a bottom portion 80 and a top portion 82. Basket 70 includes a plurality of openings or perforations 71 therein to facilitate fluid communication between an interior of basket 70 and tub 64.

A nozzle 72 is configured for flowing a liquid into tub 64. In particular, nozzle 72 may be positioned at or adjacent top portion 82 of basket 70. Nozzle 72 may be in fluid communication with one or more water sources 75, 76 in order to direct liquid (e.g. water) into tub 64 or onto articles within chamber 73 of basket 70. Nozzle 72 may further include apertures 79 through which water may be sprayed into the tub 64. Apertures 79 may, for example, be tubes extending from the nozzles 72 as illustrated, or simply holes defined in the nozzles 72 or any other suitable openings through which water may be sprayed. Nozzle 72 may additionally include other openings, holes, etc. (not shown) through which water may be flowed (i.e., sprayed or poured) into the tub 64.

In some embodiments, a main valve 74 regulates the flow of fluid through nozzle 72. For example, valve 74 can selectively adjust to a closed position in order to terminate or obstruct the flow of fluid through nozzle 72. The main valve 74 may be in fluid communication with one or more external water sources, such as a cold water source 75 and a hot water source 76. The cold water source 75 may, for example, be a commercial water supply, while the hot water source 76 may be, for example, a water heater. Such external water sources 75, 76 may supply water to the appliance 50 through the main valve 74. A cold water conduit 77 and a hot water conduit 78 may supply cold and hot water, respectively, from the sources 75, 76 through valve 74. Valve 74 may further be operable for configured to regulate the flow of hot and cold liquid, and thus the temperature of the resulting liquid flowed into tub 64, such as through the nozzle 72.

An additive dispenser 84 may additionally be provided for directing a wash additive, such as detergent, bleach, liquid fabric softener, etc., into the tub 64. For example, dispenser 84 may be in fluid communication with nozzle 72 such that water flowing through nozzle 72 flows through dispenser 84, mixing with wash additive at a desired time during operation to form a liquid or wash fluid, before being flowed into tub 64. In some embodiments, nozzle 72 is a separate downstream component from dispenser 84. In other embodiments, nozzle 72 and dispenser 84 may be integral, with a portion of dispenser 84 serving as the nozzle 72. A pump assembly 90 (shown schematically in FIG. 1) is located beneath tub 64 and basket 70 for gravity assisted flow to drain tub 64.

An agitation element 92, shown as an impeller in FIG. 1, may be disposed in basket 70 to impart an oscillatory motion to articles and liquid in chamber 73 of basket 70. In various exemplary embodiments, agitation element 92 includes a single action element (i.e., oscillatory only), double action (oscillatory movement at one end, single direction rotation at the other end) or triple action (oscillatory movement plus single direction rotation at one end, singe direction rotation at the other end). As illustrated in FIG. 1, agitation element 92 is oriented to rotate about vertical axis V. Basket 70 and agitation element 92 are driven by a motor 94, such as a pancake motor. As motor output shaft 98 is rotated, basket 70 and agitation element 92 are operated for rotatable movement within tub 64 (e.g., about vertical axis V). Washing machine appliance 50 may also include a brake assembly (not shown) selectively applied or released for respectively maintaining basket 70 in a stationary position within tub 64 or for allowing basket 70 to spin within tub 64.

Operation of washing machine appliance 50 is controlled by a processing device or controller 100. Generally, controller 100 is operatively coupled input selector 60 located on washing machine backsplash 56 for user manipulation to initiate washing machine cycles and features. Controller 100 may further be operatively coupled to various other components of appliance 50, such as main valve 74, motor 94, etc.

As illustrated, one or more passive command tags 510 may be provided as part of a communications assembly 500 for directing operation or performance of washing machine appliance 50. Each passive command tag 510 can be selectively removed from and placed on (e.g., in engagement with) the washing machine appliance 50. For example, each passive command tag 510 may be a discrete disc or badge (e.g., free of any inputs, buttons, or screens) that can be moved independently of the cabinet 52 of the washing machine appliance 50. Moreover, each passive command tag 510 may include memory (e.g., non-transitive media) that stores information or data relating to operating cycles for one or more appliances, such as the washing machine appliance 50. Such data or information may be stored in one or more predetermined fields and communicated to the washing machine appliance 50. Optionally, an icon or text indicating an operating cycle (e.g., cleaning cycle or operation) to be prompted by the passive command tag 510 may be printed or embedded on a visible surface of the passive command tag 510.

In some embodiments, a predefined region 512 configured to receive a passive command tag 510 is defined on a portion of the washing machine appliance 50. For instance, as shown, the predefined region 512 may be provided on the backsplash 56, although another suitable location on the cabinet 52 may be provided. During use, the passive command tag 510 may be separably engaged with the washing machine appliance 50, such as by selectively placing the passive command tag 510 at or on the predefined region 512. Optionally, a pocket may be formed at the predefined region 512 to hold the passive command tag 510 in place the duration of an operating cycle (e.g., cleaning cycle or operation).

One or more interface modules 120 may be provided with the washing machine appliance 50 and operatively coupled (e.g., electrically coupled) to controller 100 to facilitate communications between a passive command tag 510 (e.g., placed on or proximate to the predefined region 512) and the controller 100. Optionally, one or more wireless band or network may permit communications between passive command tag 510 and interface module 120. For instance, passive command tags 510 and the interface module 120 may be configured for radiofrequency communications (e.g., as an RFID tag and RFID reader, respectively).

In response to positioning a passive command tag 510 on or within the predefined region 512 and user manipulation of the input selector 60, controller 100 may operate the various components of washing machine appliance 50 to execute selected machine cycles and features (e.g., as dictated or instructed by an instruction signal received from a passive command tag 510).

Controller 100 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Control panel 58 and other components of washing machine appliance 50 may be in communication with controller 100 via one or more signal lines or shared communication busses.

In optional embodiments, one or more sensors 110 are included within washing machine appliance 50. Sensors 110 may be weight sensors, speed sensors, or other suitable sensors in operable communication with (e.g., electrically or wirelessly coupled to) controller 100 and utilized in the washing machine appliance to obtain performance data for the washing machine appliance 50.

In some embodiments, the controller 100 directs or determines the characteristics of the cleaning cycle of the washing machine appliance 50 based on information or data received from a passive command tag 510. In other words, inputs or instructions for the cleaning cycle may be supplied or influenced by the passive command tag 510 in selective communication with the interface module 120. For instance, the interface module 120 may be configured to generate a read signal that is transmitted to (and received by) the passive command tag 510 located at the predefined region 512. In response to receiving the read signal, the passive command tag 510 may be configured to transmit an instruction signal (e.g., to the interface module 120). Generally, the instruction signal may provide data or information relating to a desired operating cycle (e.g., cleaning cycle). In some such embodiments, the instruction signal includes parameters of a cleaning cycle that, may be, for example a selected wash cycle, a wash option, or a performance datum. Exemplary wash cycles include, for example, normal wash, spin only wash, rinse-and-spin wash, speed wash, heavy duty wash, whites wash, colors wash, delicates wash, or bulky/bedding wash. Exemplary wash options include, for example, selected spin speed, selected wash temperature, or selected load size. Exemplary performance data includes, for example, actual spin speed, actual wash temperature, or actual load size. Performance data may be sensed by sensors 110.

Data or information provided by the instruction signal may be stored within one or more fields included within a passive command tag 510. If multiple passive command tags 510 are provided, unique data or information may be stored within different passive command tags 510. In turn, each passive command tag 510 may transmit a unique instruction signal in response to receiving the read signal from the interface module 120. The controller 100 may be configured to vary the operating cycle based on the instruction signal transmitted by a passive command tag 510 and received by the interface module 120. Advantageously, a user may select the appropriate characteristics of a given cleaning cycle by using a specific corresponding passive command tag 510. Notably, the user not be required to have in-depth knowledge of the washing machine appliance 50 and would be able to intuitively change the operation or performance of the washing machine appliance 50.

In certain embodiments, data or information regarding discovered conditions or performance of the washing machine appliance 50 (e.g., during a cleaning cycle or operation) may be recorded on the passive command tag 510 located at the predefined region 512. For example, performance (e.g., discovered) data include actual spin speed, actual wash temperature, or actual load size (e.g., sensed by sensors 110). In some such embodiments, interface module 120 transmits a write signal including performance data to the passive command tag 510 (e.g., as directed by the controller 100). Once received by the passive command tag 510, such performance data may be recorded or stored on the passive command tag 510 (e.g., within one or more variable fields included with the passive command tag 510).

Optionally, one or more cycles stored within the controller 100 may be adjusted or updated based on performance data recorded over multiple discrete cycles. For instance, an estimated cycle time for a corresponding cleaning cycle may be adjusted based on the performance data from multiple executed cleaning cycles. The amount of time taken to reach a desired water temperature may vary within the individual appliance. In some such embodiments, the estimated cycle time may be updated as the average or median actual cycle time from multiple executed cleaning cycles. In additional or alternative embodiments, a suitable ratio of water (e.g., from cold water source 75 and water source 76) to reach a preset water temperature may be determined from the performance data of multiple executed cleaning cycles. As would be understood, performance data may be filtered to reduce the impact any single executed cycle.

In an illustrative embodiment, laundry items are loaded into chamber 73 of basket 70, and cleaning operation is initiated through operator manipulation of control input selector 60 (subsequent to positioning a passive command tag 510 on or within the predefined region 512). Tub 64 is filled with water and mixed with detergent to form a liquid or wash fluid. Main valve 74 can be opened to initiate a flow of water into tub 64 via nozzle 72, and tub 64 can be filled to the appropriate level for the amount of articles being washed. Once tub 64 is properly filled with wash fluid, the contents of the basket 70 are agitated with agitation element 92 for cleaning of articles in basket 70. More specifically, agitation element 92 is moved back and forth in an oscillatory motion.

After the agitation phase of the wash cycle is completed, tub 64 is drained. Laundry articles can then be rinsed by again adding fluid to tub 64, depending on the particulars of the cleaning cycle selected by a user (e.g., by placing the specific passive command tag on the predefined region), agitation element 92 may again provide agitation within basket 70. One or more spin cycles may also be used. In particular, a spin cycle may be applied after the wash cycle or after the rinse cycle in order to wring wash fluid from the articles being washed. During a spin cycle, basket 70 is rotated at relatively high speeds.

While described in the context of a specific embodiment of washing machine appliance 50, using the teachings disclosed herein it will be understood that washing machine appliance 50 is provided by way of example only. Other washing machine appliances having different configurations (such as horizontal-axis washing machine appliances), different appearances, or different features may also be utilized with the present subject matter as well.

Turning particularly to FIG. 2, a dryer appliance 200 is illustrated with a portion of a cabinet or housing 212 of dryer appliance 200 removed in order to show certain components of dryer appliance 200. While described in the context of a specific embodiment of dryer appliance 200, using the teachings disclosed herein it will be understood that dryer appliance 200 is provided by way of example only. Other dryer appliances having different appearances and different features may also be utilized with the present subject matter as well.

In some embodiments, the cabinet 212 includes a front panel 214, a rear panel 216, a pair of side panels 218 and 220 spaced apart from each other by front and rear panels 214 and 216, a bottom panel 222, and a top cover 224. Within the cabinet 212 is a fixedly mounted drum or container 226. Drum 226 is fixed within the cabinet 212, such that it is generally stationary and non-rotational during dryer appliance 200 operation. Drum 226 defines a chamber 225 for receipt of articles (e.g., clothing, linen, etc.) for drying. Drum 226 extends between a front portion 237 and a back portion 238 (e.g., along a lateral direction).

Drum 226 is generally cylindrical in shape, having an outer cylindrical wall or cylinder 228 and a front flange or wall 230 that may define an entry 232 of drum 226 (e.g., at front portion 237 of drum 226) for loading and unloading of articles into and out of chamber 225 of drum 226. Cylinder 228 may include a generally cylindrical inner surface 229. Drum 226 also includes a back or rear wall 234 (e.g., at back portion 238 of drum 226). Notably, in alternative embodiments, entry 232 may be defined in top cover 224 and cylinder 228, and front wall 230 may be a generally solid wall.

A motor 231 may be in mechanical communication with an air handler 248 such that motor 231 rotates a fan 249 (e.g., a centrifugal fan) of air handler 248. Air handler 248 is configured for drawing air through chamber 225 of drum 226 (e.g., during a laundry cycle in order to dry articles located therein as discussed in greater detail below). In alternative exemplary embodiments, dryer appliance 200 may include an additional motor (not shown) for rotating fan 249 of air handler 248 independently of drum 226.

Drum 226 may be configured to receive heated air that has been heated by a heating assembly 240 (e.g., during a laundry cycle in order to dry damp articles disposed within chamber 225 of drum 226). Heating assembly 240 includes a heating element (not shown), such as a gas burner or an electrical resistance heating element, for heating air. As discussed above, during operation (e.g., for a laundry cycle) of dryer appliance 200, motor 231 rotates fan 249 of air handler 248 such that air handler 248 draws air through chamber 225 of drum 226. In particular, ambient air enters heating assembly 240 via an entrance 251 due to air handler 248 urging such ambient air into entrance 251. Such ambient air is heated within heating assembly 240 and exits heating assembly 240 as heated air. Air handler 248 draws such heated air through duct 241 to drum 226. The heated air enters drum 226 through an outlet of duct 241 positioned at rear wall 234 of drum 226.

Within chamber 225, the heated air can remove moisture (e.g., from damp articles disposed within chamber 225). In turn, air handler 248 draws moisture statured air through a screen filter 246 which traps lint particles. Such moisture statured air then enters an exit conduit 247 and is passed through air handler 248 to an exhaust conduit 252. From exhaust conduit 252, such moisture statured air passes out of dryer appliance 200 through a vent 253 defined by cabinet 212. After the clothing articles have been dried, they are removed from the drum 226 via entry 232. A door 233 provides for closing or accessing drum 226 through entry 232.

A backsplash 271 extends from cabinet 212, and a control panel 272 including an input selector 270 (e.g., a single button, knob, or switch) is coupled to the backsplash 271. Control panel 272 and input selector 270 collectively form a user interface for operator (i.e., user) selection of machine cycles and features, and in one embodiment, a display 274 indicates selected features, a countdown timer, or other items of interest to machine users.

As illustrated, one or more passive command tags 510 may be provided as part of a communications assembly 500 for directing operation or performance of dryer appliance 200. Each passive command tag 510 can be selectively removed from and placed on (e.g., in engagement with) the dryer appliance 200. For example, each passive command tag 510 may be a discrete disc or badge (e.g., free of any inputs, buttons, or screens) that can be moved independently of the cabinet 212 of the dryer appliance 200. Moreover, each passive command tag 510 may include memory (e.g., non-transitive media) that stores information or data relating to operating cycles for one or more appliances, such as the dryer appliance 200. Such data or information may be stored in one or more predetermined fields and communicated to the dryer appliance 200. Optionally, an icon or text indicating an operating cycle (e.g., 100 cycle or operation) to be prompted by the passive command tag 510 may be printed or embedded on a visible surface of the passive command tag 510.

In some embodiments, a predefined region 512 configured to receive a passive command tag 510 is defined on a portion of the dryer appliance 200. For instance, as shown, the predefined region 512 may be provided on the backsplash 271, although another suitable location on the cabinet 212 may be provided. During use, the passive command tag 510 may be separably engaged with the dryer appliance 200, such as by selectively placing the passive command tag 510 at or on the predefined region 512. Optionally, a pocket may be formed at the predefined region 512 to hold the passive command tag 510 in place the duration of an operating cycle (e.g., laundry cycle or operation).

One or more interface modules 320 may be provided with the dryer appliance 200 and operatively coupled (e.g., electrically coupled) to a controller 300 (e.g., second controller) of the dryer appliance 200 to facilitate communications between a passive command tag 510 (e.g., placed on or proximate to the predefined region 512) and the controller 300. Optionally, one or more wireless band or network may permit communications between passive command tag 510 and interface module 320. For instance, passive command tags 510 and the interface module 320 may be configured for radiofrequency communications (e.g., as an RFID tag and RFID reader, respectively).

In response to positioning a passive command tag 510 on or within the predefined region 512 and user manipulation of the input selector 270, controller 300 may operate the various components of dryer appliance 200 to execute selected machine cycles and features (e.g., as dictated or instructed by the instruction signal received from a passive command tag 510).

Controller 300 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Control panel 272 and other components of dryer appliance 200 may be in communication with controller 300 via one or more signal lines or shared communication busses.

In optional embodiments, one or more sensors 310 are included within the dryer appliance 200. Sensors 310 may be weight sensors, speed sensors, or other suitable sensors in operable communication with (e.g., electrically or wirelessly coupled to) controller 300 and utilized in the washing machine appliance 50 to obtain performance data for the dryer appliance 200.

In some embodiments, the controller 300 directs or determines the characteristics of the laundry cycle based on information or data received from a passive command tag 510. In other words, inputs or instructions for the laundry cycle may be supplied or influenced by the passive command tag 510 in selective communication with the interface module 320. For instance, the interface module 320 may be configured to generate a read signal that is transmitted to (and received by) the passive command tag 510 located at the predefined region 512. In response to receiving the read signal, passive command tag 510 may be configured to transmit an instruction signal (e.g., to the interface module 320). Generally, the instruction signal may provide data or information relating to a desired operating cycle (e.g., laundry cycle). In some such embodiments, the instruction signal includes parameters of a laundry cycle that may be, for example a selected dry cycle, a dry option, a dry time, or a performance datum. Exemplary dry cycles include, for example, normal dry, permanent press dry, heavy duty dry, bulky/bedding dry, anti-bacterial dry, towel dry, delicates dry, and speed dry. Exemplary dry options include, for example, selected dry temperature, selected dryness level, and selected load size. Exemplary performance data includes, for example, actual spin speed, actual load temperature, or actual load size. Performance data may be sensed by sensors 310. Additionally or alternatively, performance data from the washing machine appliance 50 (FIG. 1) may be provided from the passive command tag 510 placed first at or on the predefined region but 512 of the washing machine appliance 50 and then the predefined region 512 of the dryer appliance 200.

Data or information provided by the instruction signal may be stored within one or more fields included within a passive command tag 510. If multiple passive command tags 510 are provided, unique data or information may be stored within different passive command tags 510. In turn, each passive command tag 510 may transmit a unique instruction signal in response to receiving the read signal from the interface module 320. The controller 300 may be configured to vary the operating cycle based on the instruction signal transmitted by a passive command tag 510 and received by the interface module 320. Advantageously, a user may select the appropriate characteristics of a given laundry cycle by using a specific corresponding passive command tag 510. Notably, the user not be required to have in-depth knowledge of the dryer appliance 200 and would be able to intuitively change the operation or performance of the dryer appliance 200.

The controller 300 may additionally be operable to configure to adjust the dry control information based by the wash control information (e.g., recorded or stored on the passive command tag 510). For example, the controller 300 may automatically set the dry control information for one or more dry operating conditions based on, and to correlate with, the wash control information. If the wash cycle is set to, for example, normal wash or delicate wash while the passive command tag 510 is engaged with the washing machine appliance 50 (FIG. 1), the dry cycle may be automatically set by the controller 300 to normal dry or delicate dry, respectively, when the passive command tag 510 is subsequently engaged with the dryer appliance 200. A higher spin speed may correlate with a lower dry time. Load sizes may be correlated. Various other suitable settings of control information for one or more dry operating conditions may be correlated to the control information for one or more wash operating conditions, as desired, and the controller 300 may automatically set the dry control information for these operating conditions.

Additionally or alternatively, a user may advantageously provide performance data of the cleaning cycle to which a load of laundry was subjected to before being placed within the dryer appliance 200. For instance, if the cleaning cycle ended early, the laundry operation of the dryer appliance 200 may be lengthened in order to account for a load that is wetter or more saturated than might otherwise be expected. In optional embodiments, the controller 300 may adjust one or more programmed cycles based on the wash control information (e.g., recorded or stored on the passive command tag 510) from multiple discrete cleaning cycles of the washing machine appliance 50 (FIG. 1). As an example, the estimated cycle time for a corresponding dry cycle may be adjusted if it is determined that loads from the washing machine appliance 50 are regularly wetter than might otherwise be expected after completion of a specific cleaning cycle, a default estimated cycle time (e.g., of a dry cycle) for the dryer appliance 200 may be increased.

In certain embodiments, data or information regarding discovered conditions or performance of the dryer appliance 200 (e.g., during a laundry cycle) may be recorded on passive command tag 510. For example, performance (e.g., discovered) data include actual spin speed, actual load temperature, or actual load size (e.g., sensed by sensors 310). In some such embodiments, interface module 320 transmits a write signal including performance data to the passive command tag 510 (e.g., as directed by the controller 300). Once received by the passive command tag 510, such performance data may be recorded or stored on passive command tag 510 (e.g., within one or more variable fields included with the passive command tag 510).

Optionally, one or more cycles stored within the controller 300 may be adjusted or updated based on performance data recorded over multiple discrete cycles. For instance, an estimated cycle time for a corresponding dry cycle may be adjusted based on the performance data from multiple executed dry cycles. In some such embodiments, the estimated cycle time may be updated as the average or median actual cycle time from multiple executed dry cycles. Additional or alternative embodiments may update the estimated cycle time based on other suitable criteria. As would be understood, performance data may be filtered to reduce the impact any single executed cycle.

It should be understood that, while FIG. 2 illustrates an embodiment wherein dryer assembly 200 is a horizontal axis dryer assembly. In other embodiments dryer assembly 200 may be, for example, a vertical axis dryer assembly or another suitable dryer assembly. Accordingly, the present disclosure is not limited to horizontal axis dryer assemblies. Rather, any suitable dryer assembly is within the scope and spirit of the present disclosure.

Turning now to FIG. 3, a schematic view of a communications assembly 500 in accordance with an exemplary embodiment of the present disclosure is provided. As shown, one or more consumer appliances 502A, 502B may communicate with a passive command tag 510 separately engaged with a consumer appliance 502A or 502B. Generally, each consumer appliance 502A, 502B includes a controller 520 configured to direct an operating cycle of the consumer appliance 502A or 502B. An interface module 524 operably coupled with (e.g., electrically or wirelessly to) the controller 520 is configured to receive one or more instruction signals that correspond to and influence the operating cycle of the respective consumer appliance 502A or 502B.

Although described above within the context of a washing machine appliance 50 and a dryer appliance 200, communications assembly 500 may include any suitable type of consumer appliance. For instance, a consumer appliance 502A or 502B may be provided as washing machine appliance, dryer appliance, refrigerator appliance, oven appliance, dishwasher appliance, or a thermostat of an air-conditioning assembly. The operating cycle must thus be a cleaning or wash cycle, laundry or dry cycle, refrigerator cycle, cooking cycle, dishwashing cycle, room adjustment cycle, or any other suitable cycle for operating a consumer appliance as would be understood within the art. The operating cycle may correspond to specific functions of the consumer appliance 502A or 502B or, additionally or alternatively, the type of operation (e.g., normal power, low power, etc.).

Controller 520 may include a memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. As would be understood, various components of the corresponding consumer appliance 502A or 502B, including a user input 522 (e.g., button, knob, switch, or touch screen) and interface module 524 in communication with the controller 520 via one or more signal lines or shared communication busses.

As generally illustrated, the passive command tag 510 includes a memory (e.g., non-transitive media) that stores information or data relating to the operating cycles for the corresponding consumer appliance 502A or 502B. Such data or information may be stored in one or more predetermined fields and communicated to a controller 520 of the consumer appliance 502A or 502B.

In some embodiments, the passive command tag 510 includes a plurality of fixed fields. Within the fixed fields, preset data (e.g., relating to cycle parameters or conditions for an operating cycle) are stored. The consumer appliances 502A, 502B may be unable to alter or change the preset data within the fixed fields. If multiple passive command tags 510 are provided, each passive command tag 510 may provide unique data or configurations the fixed fields. Thus, the operating cycle or operation of a consumer appliance 502A or 502B may be determined by which passive command tag 510 is placed in engagement with the consumer appliance 502A or 502B.

In additional or alternative embodiments, the passive command tag 510 includes a plurality of variable fields. Within the variable fields, discovered data (e.g., from one or more sensors within a consumer appliance 502A or 502B) are stored. In particular, discovered data may relate to performance of the consumer appliance 502A or 502B during an operating cycle thereof. The consumer appliances 502A, 502B may thus be able to change or alter the discovered data with the variable fields (e.g., according to an actual executed operating cycle). Optionally, the discovered data from the operating cycle of one consumer appliance 502A or 502B may be communicated to another consumer appliance 502B or 502A by moving the passive command tag 510 out of engagement with the first consumer appliance 502A or 502B and into engagement with the other consumer appliance 502B or 502A.

In optional embodiments, a secondary device 550 is provided to selectively couple with the passive command tag 510 (e.g., directly or through an intermediate network). When coupled with the passive command tag 510, the secondary device 550 may read or alter data within the fields of the passive command tag 510.

Secondary device 550 can be any type of device, such as, for example, a personal computing device (e.g., laptop or desktop), a mobile computing device (e.g., smartphone or tablet), a wearable computing device, an embedded computing device, a remote, or any other suitable type of user computing device. Secondary device 550 can include one or more secondary device controllers 552. Controller 552 can include one or more processors and one or more memory devices. The one or more processors can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor to cause secondary device 550 to perform operations (e.g., as directed by user interaction with one or more user inputs 553). Controller 552 may include an interface module 554 (e.g., RFID read or write module) such that secondary device 550 can connect to and communicate with (e.g., electrically or wirelessly) the passive command tag 510. Thus a secondary device 550 may be configured to read or write data to one or more fields (e.g., relating to the instruction signal) within the passive command tag 510. Controller 552 can also include one or more transmitting, receiving, or transceiving components for transmitting/receiving communications with other devices (e.g., directly or indirectly through a wireless network).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance communications system comprising:
   an appliance comprising
      a cabinet defining a chamber,
      a door movable between an open position facilitating access to the chamber and a closed position restricting access to the chamber,
      a controller fixedly mounted to the cabinet, the controller being configured to direct an operating cycle, and
      an interface module fixedly mounted to the cabinet, the interface module being configured to receive an instruction signal corresponding to the operating cycle; and
   a passive command tag independently movable relative to the cabinet and separably engaged with the appliance in selective communication with the interface module, the passive command tag configured to transmit the instruction signal in response to a read signal received from the interface module, wherein the controller is further configured to vary the operating cycle based on the received instruction signal.

2. The appliance communications system of claim 1, wherein the passive command tag comprises a plurality of fixed fields storing preset data relating to cycle parameters of the operating cycle within the passive command tag, and wherein the one or more instruction signals correspond to the preset data in the plurality of fixed fields.

3. The appliance communications system of claim 1, wherein the passive command tag comprises a plurality of variable fields storing discovered data relating to performance of the appliance during the operating cycle.

4. The appliance communications system of claim 1, further comprising a secondary device configured to write data to one or more fields relating to the instruction signal within the passive command tag.

5. The appliance communications system of claim 1, wherein the passive command tag is a first tag, and wherein the appliance communications system further comprises a second tag configured to transmit a unique instruction signal in response to a read signal received from the interface module.

6. The appliance communications system of claim 1, wherein the appliance is a first appliance, wherein the appliance communications system further comprises a second appliance, the second appliance comprising a controller configured to direct an operating cycle of the second appliance and an interface module configured to receive a second instruction signal corresponding to the operating cycle of the second appliance, and wherein the passive command tag is configured to transmit the second instruction signal to the second appliance in response to a read signal received from the interface module of the second appliance, wherein the controller of the second appliance is further configured to vary the operating cycle of the second appliance based on the received second signal.

7. The appliance communications system of claim 6, wherein the first appliance is a washing machine appliance, and wherein the second appliance is a dryer appliance.

8. The appliance communications system of claim 1, wherein the appliance is a refrigerator appliance.

9. The appliance communications system of claim 1, wherein the appliance is an oven appliance.

10. The appliance communications system of claim 1, wherein the appliance is a dishwasher appliance.

11. The appliance communications system of claim 6, wherein the second instruction signal is based on one or more signals received from the first appliance.

12. The appliance communication system of claim 1, wherein the appliance is a washing machine appliance.

13. The appliance communication system of claim 1, wherein the appliance is a dryer appliance.

14. An appliance communications system comprising:
   an appliance comprising
      a cabinet defining a chamber,
      a door movable between an open position facilitating access to the chamber and a closed position restricting access to the chamber,
      a controller fixedly mounted to the cabinet, the controller being configured to direct an operating cycle, and
      an interface module configured to receive an instruction signal corresponding to the operating cycle; and
   a plurality of passive command tags, each passive command tag of the plurality of passive command tags being independently movable relative to the cabinet, each passive command tag of the plurality of passive command tags being configured to selectively and individually communicate with the interface module, each passive command tag of the plurality of passive command tags being configured to transmit a unique instruction signal in response to a read signal received from the interface module, wherein the controller is further configured to vary the operating cycle based on a received instruction signal from one passive command tag of the plurality of passive command tags.

15. The appliance communications system of claim 14, wherein each passive command tag comprises a plurality of fixed fields storing preset data relating to cycle parameters of the operating cycle within each passive command tag, wherein the one or more instruction signals correspond to the preset data in the plurality of fixed fields, and wherein each passive command tag comprises a plurality of variable fields storing discovered data relating to performance of the appliance during the operating cycle.

16. The appliance communications system of claim 14, further comprising a secondary device configured to write data to one or more fields relating to the instruction signal within the passive command tag.

17. The appliance communications system of claim 14, wherein the appliance is a first appliance, wherein the appliance communications system further comprises a second appliance, the second appliance comprising a controller configured to direct an operating cycle of the second appliance and an interface module configured to receive a second instruction signal corresponding to the operating cycle of the second appliance, and wherein the passive command tag is configured to transmit the second instruction signal to the second appliance in response to a read signal received from the interface module of the second appliance, wherein the controller of the second appliance is further configured to vary the operating cycle of the second appliance based on the received second signal.

18. The appliance communications system of claim 17, wherein the first appliance is a washing machine appliance, and wherein the second appliance is a dryer appliance.

19. The appliance communications system of claim 17, wherein the second instruction signal is based on one or more signals received from the first appliance.

20. An appliance communications system comprising:
an appliance comprising
a cabinet defining a chamber,
a door movable between an open position facilitating access to the chamber and a closed position restricting access to the chamber,
a controller fixedly mounted to the cabinet, the controller being configured to direct an operating cycle, and
an interface module fixedly mounted to the cabinet, the interface module being configured to receive an instruction signal corresponding to the operating cycle; and
a passive command tag free of any inputs, buttons, and screens, the passive command tag being movable independently of the cabinet and separably engaged with the appliance in selective communication with the interface module,
wherein the passive command tag is configured to transmit the instruction signal in response to a read signal received from the interface module, and wherein the controller is further configured to vary the operating cycle based on the received instruction signal.

\* \* \* \* \*